United States Patent
McPhillen et al.

(10) Patent No.: US 9,924,164 B2
(45) Date of Patent: Mar. 20, 2018

(54) EFFICIENT RE-TRANSCODING OF KEY-FRAME-ALIGNED UNENCRYPTED ASSETS

(71) Applicants: Jared McPhillen, Glendale, CA (US); Kevin Liao, Rancho Palos Verdes, CA (US); Mark Arana, West Hills, CA (US)

(72) Inventors: Jared McPhillen, Glendale, CA (US); Kevin Liao, Rancho Palos Verdes, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 589 days.

(21) Appl. No.: 13/733,848

(22) Filed: Jan. 3, 2013

(65) Prior Publication Data
US 2014/0185667 A1  Jul. 3, 2014

(51) Int. Cl.
H04N 19/40  (2014.01)

(52) U.S. Cl.
CPC ....... *H04N 19/00472* (2013.01); *H04N 19/40* (2014.11)

(58) Field of Classification Search
USPC .................................................... 375/240.03
See application file for complete search history.

(56) References Cited

U.S. PATENT DOCUMENTS

| | | | | |
|---|---|---|---|---|
| 5,819,004 A | * | 10/1998 | Azadegan | G11B 27/031 |
| | | | | 375/E7.088 |
| 2002/0152317 A1 | * | 10/2002 | Wang | H04N 21/234354 |
| | | | | 709/231 |
| 2002/0181595 A1 | * | 12/2002 | Obata | H04N 19/159 |
| | | | | 375/240.25 |
| 2004/0098463 A1 | * | 5/2004 | Shen | G06F 17/30902 |
| | | | | 709/213 |
| 2004/0228413 A1 | * | 11/2004 | Hannuksela | H04N 21/6437 |
| | | | | 375/240.25 |
| 2007/0061490 A1 | * | 3/2007 | Sullivan | G11B 27/36 |
| | | | | 709/247 |
| 2007/0162568 A1 | * | 7/2007 | Gupta | G06Q 30/0242 |
| | | | | 709/219 |
| 2008/0098301 A1 | * | 4/2008 | Black | H04L 67/1008 |
| | | | | 715/246 |
| 2008/0124050 A1 | * | 5/2008 | Deschamp | G11B 27/034 |
| | | | | 386/241 |
| 2010/0074333 A1 | * | 3/2010 | Au et al. | 375/240.12 |
| 2011/0038416 A1 | * | 2/2011 | Zhou | H04N 19/176 |
| | | | | 375/240.13 |
| 2011/0264676 A1 | * | 10/2011 | Belan et al. | 707/756 |
| 2012/0002717 A1 | * | 1/2012 | Ma et al. | 375/240.01 |
| 2012/0084463 A1 | * | 4/2012 | Holden | H04N 21/23439 |
| | | | | 709/246 |

(Continued)

*Primary Examiner* — Jayanti K Patel
*Assistant Examiner* — Shadan E Haghani
(74) *Attorney, Agent, or Firm* — Sherppard Mullin Richter & Hampton LLP

(57) ABSTRACT

Systems and methods are provided for re-transcoding portions of a digital media file while maintaining key-frame alignment across a set of digital media files having the same content. Instead of re-transcoding the entire set of digital media files if a portion of a single video fails quality, the disclosed systems and methods allow only the failing portion of the video to be re-transcoded.

24 Claims, 4 Drawing Sheets

(56) References Cited

U.S. PATENT DOCUMENTS

| | | | |
|---|---|---|---|
| 2012/0155553 A1* | 6/2012 | Liao | H04N 21/6125 |
| | | | 375/240.26 |
| 2012/0201475 A1* | 8/2012 | Carmel | H04N 19/172 |
| | | | 382/238 |
| 2013/0166580 A1* | 6/2013 | Maharajh | H04L 65/605 |
| | | | 707/758 |
| 2014/0119457 A1* | 5/2014 | MacInnis et al. | 375/240.26 |
| 2014/0247887 A1* | 9/2014 | Brueck | H04N 19/40 |
| | | | 375/240.26 |

* cited by examiner options: 854x480 fps=25/1 timebase=1/25 bitdepth=8 cabac=1 ref=11 deblock=1:1:1
analyse=0x3:0x113 me=umh subme=8 psy=1 psy_rd=1.00:0.15 mixed_ref=1
me_range=16 chroma_me=1 trellis=1 8x8dct=1 cqm=0 deadzone=21,11 fast_pskip=1
chroma_qp_offset=-3 threads=6 sliced_threads=0 nr=0 decimate=1 interlaced=0
bluray_compat=0 constrained_intra=0 bframes=5 b_pyramid=2 b_adapt=2 b_bias=0
direct=3 weightb=1 open_gop=0 weightp=2 keyint=24 keyint_min=2 scenecut=1
intra_refresh=0 rc_lookahead=24 rc=2pass mbtree=0 bitrate=1800 ratetol=1.0
qcomp=0.60 qpmin=5 qpmax=35 qpstep=4 cplxblur=20.0 qblur=0.5
vbv_maxrate=1900 vbv_bufsize=1304 nal_hrd=none ip_ratio=1.40 pb_ratio=1.30
aq=1:1.00                                                                 ⟵201 in:0 out:0 type:I dur:2 cpbdur:2 q:26.93 tex:182662 mv:66285 misc:221 imb:3600
pmb:0 smb:0 d:- ref:;

in:4 out:1 type:P dur:2 cpbdur:2 q:26.27 tex:77315 mv:12702 misc:2431 imb:447
pmb:1049 smb:2104 d:- ref:0 ;

in:2 out:2 type:B dur:2 cpbdur:2 q:27.41 tex:30631 mv:11358 misc:1251 imb:198   ⟵202
pmb:896 smb:2506 d:s ref:0 ;

in:1 out:3 type:b dur:2 cpbdur:2 q:28.54 tex:19299 mv:10053 misc:1352 imb:119
pmb:786 smb:2695 d:s ref:0 ;

in:3 out:4 type:b dur:2 cpbdur:2 q:28.54 tex:12204 mv:5243 misc:1337 imb:31
pmb:516 smb:3053 d:- ref:0 ;

in:7 out:5 type:P dur:2 cpbdur:2 q:27.27 tex:249083 mv:24573 misc:392 imb:3192
pmb:375 smb:33 d:- ref:0 ;

...

in:96 out:96 type:I dur:2 cpbdur:2 q:17.28 tex:806615 mv:164123 misc:182 imb:3600   ⟵203
pmb:0 smb:0 d:s ref:;

...

in:105 out:105 type:I dur:2 cpbdur:2 q:17.28 tex:806615 mv:164123 misc:182
imb:3600 pmb:0 smb:0 d:s ref:;                                             ⟵204

...

in:201 out:201 type:I dur:2 cpbdur:2 q:17.28 tex:806615 mv:164123 misc:182
imb:3600 pmb:0 smb:0 d:s ref:;                                             ⟵205

..

in:1434 out:1436 type:b dur:2 cpbdur:2 q:19.92 tex:41115 mv:11131 misc:3514
imb:38 pmb:1810 smb:1752 d:s ref:0 ;

Fig. 2

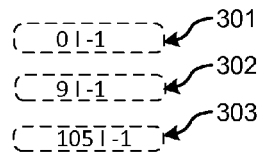

Fig. 3

```
#options: 854x480 fps=25/1 timebase=1/25 bitdepth=8 cabac=1 ref=11 deblock=1:1:1
analyse=0x3:0x113 me=umh subme=8 psy=1 psy_rd=1.00:0.15 mixed_ref=1 me_range=16
chroma_me=1 trellis=1 8x8dct=1 cqm=0 deadzone=21,11 fast_pskip=1
chroma_qp_offset=-3 threads=6 sliced_threads=0 nr=0 decimate=1 interlaced=0
bluray_compat=0 constrained_intra=0 bframes=5 b_pyramid=2 b_adapt=2 b_bias=0
direct=3 weightb=1 open_gop=0 weightp=2 keyint=24 keyint_min=2 scenecut=1
intra_refresh=0 rc_lookahead=24 rc=2pass mbtree=0 bitrate=1800 ratetol=1.0 qcomp=0.60
qpmin=5 qpmax=35 qpstep=4 cplxblur=20.0 qblur=0.5 vbv_maxrate=1900
vbv_bufsize=1304 nal_hrd=none ip_ratio=1.40 pb_ratio=1.30 aq=1:1.00
```
← 401

```
in:0 out:0 type:I dur:2 cpbdur:2 q:17.28 tex:806615 mv:164123 misc:182 imb:3600 pmb:0
smb:0 d:s ref:;

in:4 out:1 type:P dur:2 cpbdur:2 q:20.41 tex:77315 mv:12702 misc:2431 imb:447
pmb:1049 smb:2104 d:- ref:0 ;

in:2 out:2 type:B dur:2 cpbdur:2 q:30.92 tex:30631 mv:11358 misc:1251 imb:198 pmb:896
smb:2506 d:s ref:0 ;

in:1 out:3 type:b dur:2 cpbdur:2 q:22.39 tex:19299 mv:10053 misc:1352 imb:119 pmb:786
smb:2695 d:s ref:0 ;

...

in:9 out:9 type:I dur:2 cpbdur:2 q:17.28 tex:806615 mv:164123 misc:182 imb:3600 pmb:0
smb:0 d:s ref:;

...

in:105 out:105 type:I dur:2 cpbdur:2 q:17.28 tex:806615 mv:164123 misc:182 imb:3600
pmb:0 smb:0 d:s ref:;

EFFICIENT RE-TRANSCODING OF KEY-FRAME-ALIGNED UNENCRYPTED ASSETS

TECHNICAL FIELD

The present disclosure relates generally to digital media encoding, and more particularly, some embodiments relate to systems and methods for detecting artifacts or defects in encoded digital media files.

DESCRIPTION OF THE RELATED ART

Due to the growing number of digital media distribution platforms that are available, a single piece of media content, such as a movie, is often digitized or transcoded into different formats and bit-rates. Before these new, compressed assets can be used for distribution, their quality and integrity need to be verified and must pass a defined threshold of perceived quality.

BRIEF SUMMARY

Systems and methods are provided for re-transcoding portions of a digital media file while maintaining key-frame alignment across a set of digital media files having the same content. Adaptive video streaming often uses multiple digital media files having the same content but differing quality levels. Key frame alignment across the set of files allows relatively seamless switching between different files to adapt to changing connection conditions. Quality control (QC) is typically performed on each file of the set. Instead of re-transcoding the entire set of digital media files if a portion of a single video fails QC, the disclosed systems and methods allow only the failing portion of the video to be re-transcoded. This may provide significant improvements in retranscoding and QC processing time.

In some implementations, a timestamp and length of an original video segment, such as a QC failing segment, of a transcoded video file is obtained. A video statistics file output during transcode of the failing clip is also obtained. The video statistics file is parsed to generate a key frame listing file for the video segment. The original video segment is then re-transcoded to produce a re-transcoded video segment. The key frame listing file is used to maintain the same key frame locations between the original video segment and the re-transcoded video segment. The re-transcoded video segment may then be substituted for the original video segment without disrupting key frame alignment.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 2 provides an example of a transcoding statistics file.

FIG. 3 provides an example of a key frame listing file.

FIG. 4 provides an example of a segment transcoding statistics file.

DETAILED DESCRIPTION

A lossy encoding process sacrifices information to compress data. Many digital media encoding techniques follow a common chain of steps: (1) prediction; (2) transformation and quantization; and (3) entropy coding. Additionally, many encoders are programmed to be operable under various constraints, such as file size, average bitrate, and maximum bitrate constraints. Meeting these constraints often requires compromising between output quality and compression. These quality compromises often result in digital media artifacts or defects, such as ringing, blocking, or break-up of the picture. Such defects often occur only in portions of a digital media file, leaving the remainder of the file with suitable quality. For example, often, scenes with a great deal of activity are particularly susceptible to such glitches.

Many content distributors create multiple versions of a single video, song, or other digital media program for multiple avenues of distribution. For example, for a single piece of content, a video distributor might maintain a plurality of different files having the same resolution but different bitrates. These groups of files may be used in web distribution using adaptive variable bitrate streaming techniques. These adaptive streaming techniques typically require key frame alignment across the group of files. Performing quality assurance (QA) on the resulting large number of files can be time consuming and costly. In particular, when a single file of a group of files has a coding defect, the entire group of files may have to be re-transcoded to maintain key frame alignment.

Figure 1:
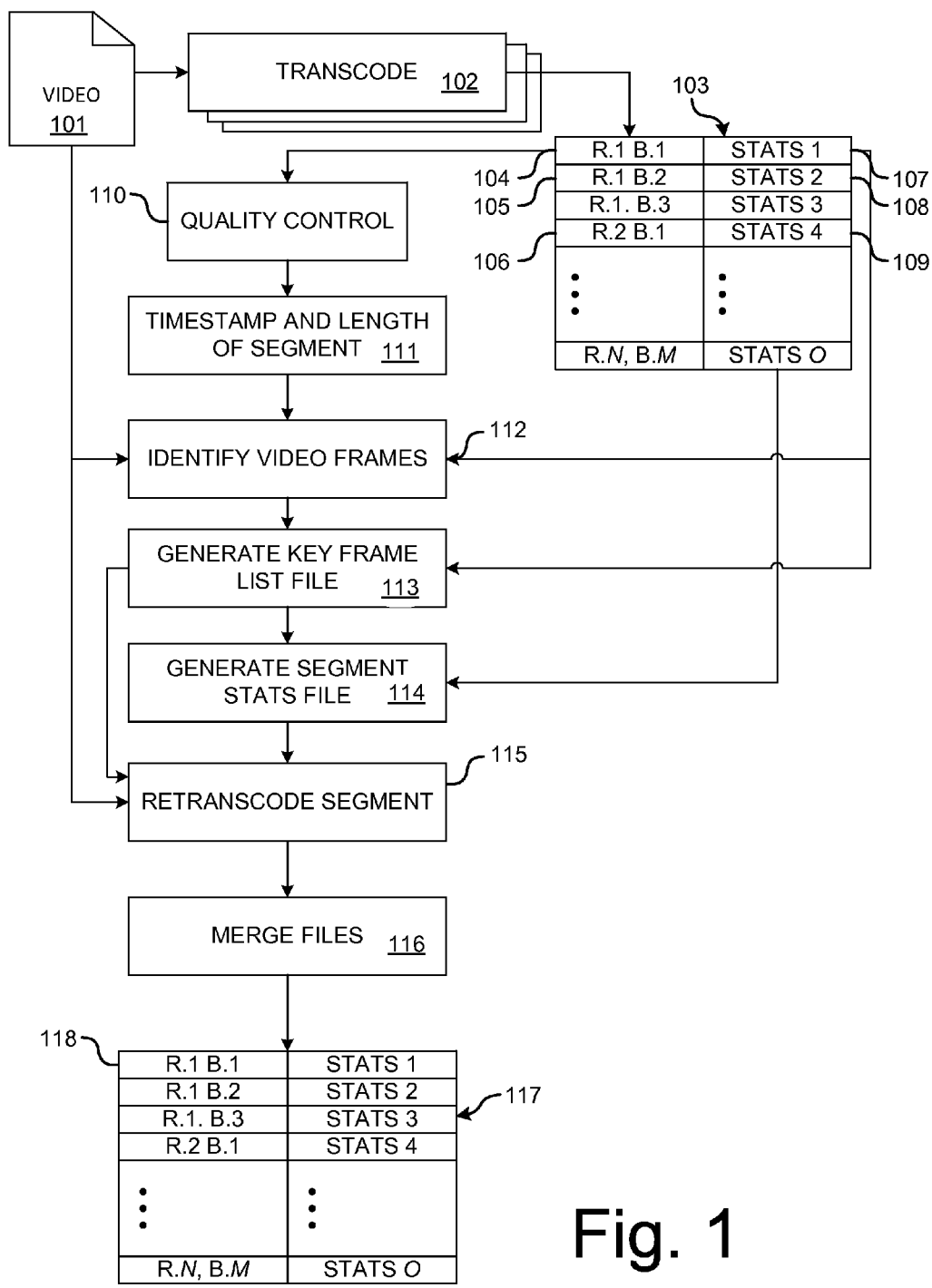
FIG. 1 illustrates an example method of re-transcoding portions of digital media files to maintain key frame alignment without re-transcoding the entire group of file.

FIG. 1 illustrates an example method of re-transcoding portions of digital media files to maintain key frame alignment without re-transcoding the entire group of files. In this example, a video file 101 is transcoded 102 multiple times to produce a group 103 of transcoded video files 104, 105, 106 and associated transcoding statistics files 107, 108, 109. The transcoded video files may have different resolutions and bit rates. In other implementations, the group may have a single resolution with various bitrates.

An example of a transcoding statistics file (stats file) is given in FIG. 2. Such stats files may be output by transcoders, such as H.264 compliant coders like the x.264 transcoder. Stats files both detail various parameters that were used when transcoding a file and may be used by transcoders in future encoding passes. For example, in a two-pass encoding procedure, a source video is analyzed by the transcoder to produce a preliminary stats file. The preliminary stats file is then used in the second encoding pass to produce an encoded file. The stats file comprises a list of options 201 that are used to set various transcoding parameters. The stats file further comprises parameters that are used to encode each frame of the video. The parameters may include input and output frame number, frame type, bit allocations for the frame, motion vectors, and residuals, and other transcoding parameters. Groups 202, 203, 204, and 205 are groups of parameters for a sequence of group-of-pictures (GOPs) of the video. A GOP comprises a key frame, or intra-frame (I-frame), followed by various inter-frames, such as P-frames, B-frames, or b-frames. The stats file includes a list of parameters 202 for each GOP indexed by output frame number. Accordingly, these output frame numbers may be used instead of or in conjunction with timestamps to refer to selected video frames.

Returning to FIG. 1, a QC 110 process is performed on the group of videos. The QC process 110 may be any manual, automatic, or hybrid quality control procedure that identifies a failing video segment. If a video of the group of videos fails QC, the data identifying the failing segment is stored. This data may comprise the timestamp and length of the segment 111. The failing segment may be expanded to include the last key frame before the beginning of the failing segment. Additionally, the segment may be expanded to include one or more GOPs prior to the first GOP of the failing segment and one or more GOPs after the last GOP of the failing segment.

The re-transcoding process begins by identifying the video frames 112 of the video 101 that correspond to the segment identified in step 111. In some cases, for each key frame, the output frame number is the same as the input frame number. Accordingly, the frame number of the first key frame and the length of the segment are sufficient to determine 112 the video frames to be re-transcoded. In other implementations, the stats file for the failing video (e.g., if video 104 failed, stats file 107) may be used to determine 112 the appropriate video frames that need to be re-transcoded. In particular, the stats file 107 may be used if the output frame sequence of the failing video 104 is different from the input frame sequence from the source video 101. The stats file 107 may be used as a map to determine the correct frame sequence from the video 101.

A key frame list file is generated from the stats file 107 of the failing video 104. The key frame list file comprises a listing by frame of each key frame. The key frame list file maintains the same number of frames between each key frame as the stats file from which it is derived. However, the file is renumbered so that the first key frame of the failing segment is numbered as the first frame.

FIG. 3 illustrates a key frame list file generated from the stats file illustrated in FIG. 2. In this example, the segment to be re-transcoded includes the GOPs associated with the stat groups 203, 204, and 205. The segment to be re-transcoded starts with frame 96 and ends with the last frame of GOP 205. The key frame file is generated by making a list by frame number of each key frame (I-frame) of the segment to be re-transcoded. In this example, each entry 301, 302, 303 includes the frame number, frame type (here, 'I'), and a quality parameter (QP). In this particular example, the QP value '−1' indicates that the encoder should decide what QP to use for transcoding the frame. The key frame list file is renumbered so that the first key frame of GOP 203 the failing segment, 96, is renumbered to be frame 0. Similarly, the key frame numbered 105 of GOP 204 is renumbered to be frame 9, and the key frame number 201 of group 205 is renumbered 105. This renumbering maintains the same distance between key frames.

Returning to FIG. 1, in some implementations, if a video 104 of the group 103 fails QC 110, then other videos of the group 103 have their corresponding video segments re-transcoded. The other videos to be re-transcoded may be the videos 105 having the same resolution as the failing video 104; may be every other video 105, 106 in the group; or may be some other divisions, such as all videos to be used in adaptive streaming of the content. In these implementations, step 113 may be repeated for each video of the group 103 that will be re-transcoded. Accordingly, each video 105, 106 to be re-transcoded has a key frame list file generated from the video's corresponding stats file 108, 109.

In step 114, a stats file is generated for the failing video segment. The video segment stats file is parsed from the stats file 107 of the failing video. The segment stats file includes the parameters from the entire stats file 107 for each of the frames of the video segment to be re-transcoded. Similar to the key frame list file, the video segment stats file is renumbered so that the first frame of the segment is renumbered 0.

FIG. 4 illustrates an example video segment stats file parsed from the stats file of FIG. 2 and covering the same segment as FIG. 3. The stats file comprises a list of options 401 for the encoding process. In some implementations, the options 401 are copied from the stats file 107 of the video file without modification. The segment stats file further comprises the parameters 402 for each frame of the video segment to be re-transcoded. In this example, the video segment begins at frame 96, so the parameters for the GOPs starting with frame 96 to frame 201 are used to generate the segment stats file. Each element of the list has both its input and output frame numbers renumbered by subtracting 96 from each number. This renumbering maintains the frame sequence but renumbers frame 96 from the original stats file as frame 0 in the segment stats file. The parameters in the segment stats file are otherwise unmodified from the original stats file.

Returning to FIG. 1, if multiple videos of group 103 are to be re-transcoded, the step of generating the segment stats file 114 may be repeated for each video. The corresponding stats file 108, 109 of each video 105, 106 of the group 103 that is going to be re-transcoded is parsed to generate a corresponding segment stats file.

In other implementations, the step of generating the segment stats file 114 may be performed by retrieving the segment to be re-transcoded and storing it as separate file. The segment may then be input into the transcoder along with the key frame list file generated in step 113. Then, a first encoding pass by the transcoder may be used to generate the segment stats file 114. In still further implementations, the step of generating the segment stats file 114 may be omitted.

In step 115, the failing video segment is re-transcoded. The frames of the segment identified in step 112 are retrieved from the video file 101. The key frame list file generated in step 113 is input into the transcoder to re-transcode the segment while maintaining the same key frame locations as the original, failing segment within the originally transcoded video file 104. In other words, if a frame in the failing segment was originally transcoded as a key frame, the corresponding frame in the segment copied from the video file 101 will be re-transcoded as a key frame. If step 114 was performed to generate a segment stats file, the segment stats file may also be input into the transcoder when re-transcoding 115.

If corresponding segments from multiple files of the group 103 will be re-transcoded, then step 115 may be repeated for each segment to be re-transcoded. In some implementations, a single key frame list file may be used for re-transcoding the segments. A plurality of the files of the group 103 may have aligned key frames—for example, for use in adaptive video streaming. A single key frame list file 113 may then be used to re-transcode each file of the plurality having aligned key frames. Accordingly, after re-transcoding, key frame alignment is maintained throughout the plurality of files.

In step 116, the failing segment of the video 104 is replaced with the re-transcoded segment produced in step 115. The merged file 118 is then substituted for the failing file 104 to produce an updated group of files 117. Because the re-transcoded segment has the same key frame locations as the failing segment, the merged file produced in step 116 has the same key frame location as the original failing file 104. Accordingly, key frame alignment is maintained across the group of files 103 without re-transcoding the entire group of key frame aligned files.

If corresponding segments from multiple files of the group 103 were re-transcoded 115, then step 116 is repeated for each re-transcoded segment. Because each re-transcoded segment has the same key frame locations as the original corresponding segment, key frame alignment is maintained across the updated group of files 117 without re-transcoding each file in full.

Where components or modules are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

Figure 5:
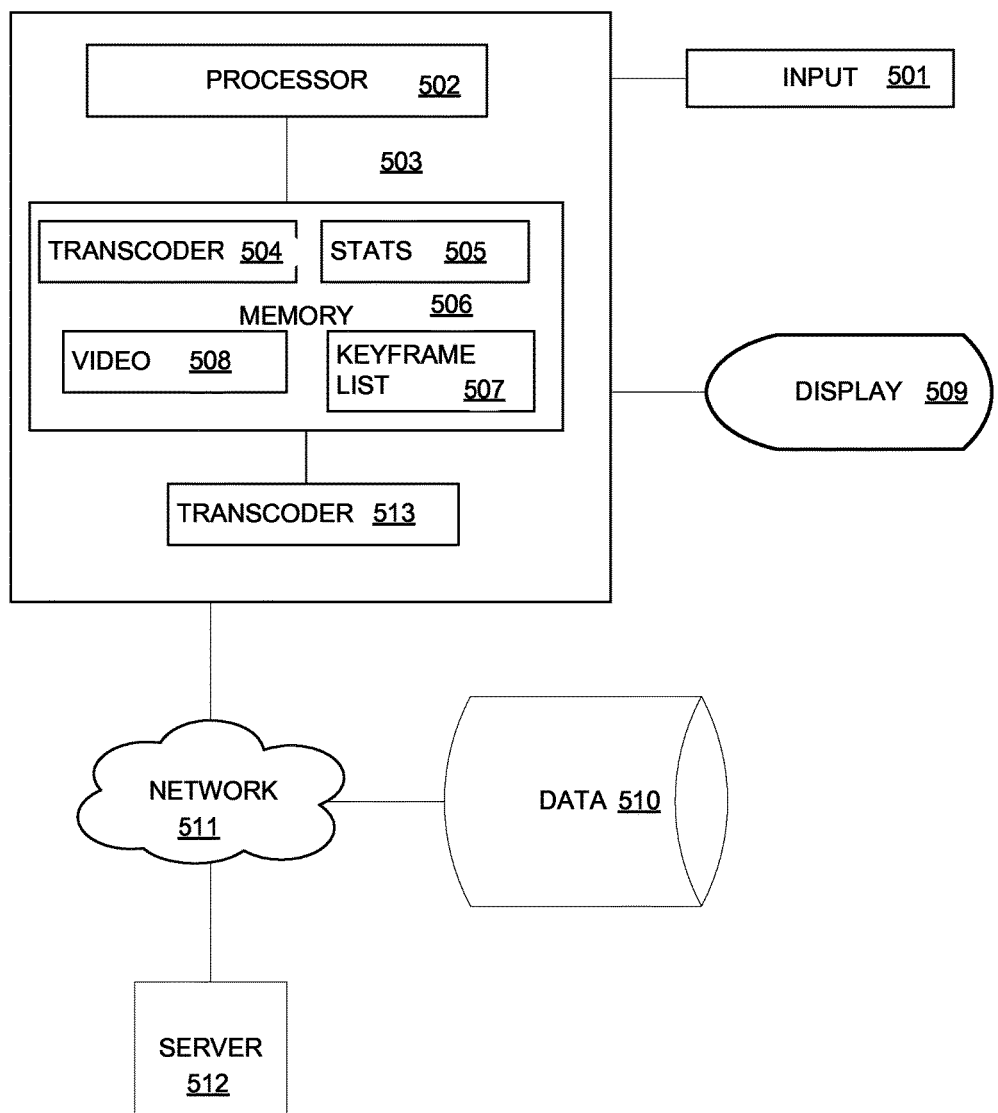
FIG. 5 illustrates an example computing module that may be used in implementing various features of the disclosure.

FIG. 5 presents an exemplary diagram of a system for providing a re-transcoding key-frame aligned digital assets. The system includes workstation 503, display 509, input device 501, network 512, server 513, and data 511. Workstation 503 includes processor 502, memory 506, and, optionally, hardware transcoder 513. In addition to memory 506, the workstation 503 may include other non-transitory computer readable media, such as non-volatile storage devices. Various data elements and programs may be stored in memory 506. For example, the transcoding program 504 may be stored and executed from memory 506. Data that is used by the transcoding program 504 may also be stored in memory 506. As described above, such data may include digital media files 508 and associated stats file 505. In some cases, all digital media files 508 that will be used by transcoding program 504 are stored in memory 506. In other cases, the files 508, 505 are a subset of the files to be processed. Other files may be provided to the workstation 503 over the network 512 or may be stored in local non-volatile storage.

Workstation 503 may comprise any computing device such as a rackmount server, desktop computer, or mobile computer. A system user may utilize input device 501, for example a keyboard and mouse, to direct the operation of transcoding program 504 executing from memory 506 by processor 502. Additionally, aspects of the transcoding program may be executed by a GPU or a hardware transcoder 513. In some implementations, the files 508, 505 may be received over network 512 from data store 511 or server 513. Alternatively, some or all of the files 508, 505 may be generated in the workstation 503. Network 512 may be a high speed network suitable for high performance computing (HPC), for example a 10 GigE network or an InfiniBand network.

While various implementations have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of re-transcoding a video file, comprising:
   identifying an original video segment located within a transcoded video file, the original video segment having failed a quality control procedure, wherein the quality control procedure comprises verifying that the original video segment is free from one or more digital media artifacts;
   obtaining a timestamp and length of the original video segment;
   obtaining a video statistics file output during transcoding the transcoded video file;
   parsing the video statistics file to generate a key frame listing file for the original video segment, wherein the key frame listing file comprises a plurality of key frame identifiers, each key frame identifier comprising an original key frame index equal to a frame number of a corresponding key frame;
   assigning to each key frame identifier a renumbered key frame index without changing a relative spacing between adjacent renumbered key frame indices as compared with adjacent original key frame indices, wherein a first renumbered key frame index from a key frame identifier located at a beginning of the key frame listing file equals a first frame number corresponding to a first key frame located at a beginning of the original video segment; and
   re-transcoding the original video segment to produce a re-transcoded video segment using the key frame listing file, such that a re-transcoded key frame location in the re-transcoded video segment is the same as an original key frame location from the original video segment,
   wherein the transcoded video file is transcoded at a first bitrate and is one of a plurality of transcoded video files transcoded at a corresponding plurality of bitrates, and further comprising:
   using the key frame listing file, re-transcoding video segments corresponding to the original video segment from each of the plurality of transcoded video files to produce a plurality of corresponding re-transcoded video segments for each of the plurality of bitrates.

2. The method of claim 1, wherein the key frame listing file further comprises a quantization parameter for each key frame identifier.

3. The method of claim 1, further comprising:
   parsing the video statistics file to generate a video segment statistics file for the original video segment;
   wherein the step of re-transcoding the original video segment further comprises utilizing the video segment statistics file during re-transcoding the original video segment.

4. The method of claim 1, further comprising:
   updating the transcoded video file by replacing the original video segment with the re-transcoded video signal.

5. The method of claim 4, further comprising:
   updating the video statistics file by replacing a portion of the video statistics file corresponding to the original video segment with a re-transcoded video segment statistics file generated during the step of re-transcoding the original video segment.

6. The method of claim 1, further comprising:
   updating each of the plurality of transcoded video files by replacing the video segments corresponding to the original video segment with the corresponding re-transcoded video segment.

7. The method of claim 1, wherein the digital media artifacts comprise ringing, blocking, or picture break-up.

8. The method of claim 1, wherein the first frame number is 0.

9. A non-transitory computer readable medium storing a computer program configured to cause a computer to perform a method of re-transcoding a video file, the method comprising:
   identifying an original video segment located within a transcoded video file, the original video segment having failed a quality control procedure, wherein the quality control procedure comprising verifying that the original video segment is free from one or more digital media artifacts;
   obtaining a timestamp and length of an the original video segment;
   obtaining a video statistics file output during transcoding the transcoded video file;
   parsing the video statistics file to generate a key frame listing file for the video segment, wherein the key frame listing file comprises a plurality of key frame identifiers, each key frame identifier comprising an original key frame index equal to a frame number of a corresponding key frame;
   assigning to each key frame identifier a renumbered key frame index without changing a relative spacing between adjacent renumbered key frame indices as compared with adjacent original key frame indices, wherein a first renumbered key frame index from a key frame identifier located at a beginning of the key frame listing file equals a first frame number corresponding to a first key frame located at a beginning of the original video segment; and
   re-transcoding the original video segment to produce a re-transcoded video segment using the key frame listing file, such that a re-transcoded key frame location in the re-transcoded video segment is the same as an original key frame location from the original video segment,
   wherein the transcoded video file is transcoded at a first bitrate and is one of a plurality of transcoded video files transcoded at a corresponding plurality of bitrates, and further comprising:
   using the key frame listing file, re-transcoding video segments corresponding to the original video segment from each of the plurality of transcoded video files to produce a plurality of corresponding re-transcoded video segments for each of the plurality of bitrates.

10. The non-transitory computer readable medium of claim 9, wherein the key frame listing file further comprises a quantization parameter for each key frame identifier.

11. The non-transitory computer readable medium of claim 9, wherein the method further comprises:
    parsing the video statistics file to generate a video segment statistics file for the original video segment;
    wherein the step of re-transcoding the original video segment further comprises utilizing the video segment statistics file during re-transcoding the original video segment.

12. The non-transitory computer readable medium of claim 9, wherein the method further comprises:
    updating the transcoded video file by replacing the original video segment with the re-transcoded video signal.

13. The non-transitory computer readable medium of claim 12, wherein the method further comprises:
    updating the video statistics file by replacing a portion of the video statistics file corresponding to the original video segment with a re-transcoded video segment statistics file generated during the step of re-transcoding the original video segment.

14. The non-transitory computer readable medium of claim 9, wherein the method further comprises:
updating each of the plurality of transcoded video files by replacing the video segments corresponding to the original video segment with the corresponding re-transcoded video segment.

15. The non-transitory computer readable medium of claim 9, wherein the digital media artifacts comprise ringing, blocking, or picture break-up.

16. The non-transitory computer readable medium of claim 9, wherein the first frame number is 0.

17. A computer, comprising:
a processor;
a transcoder; and
a memory storing instructions to cause the processor to perform the steps of:
identifying an original video segment located within a transcoded video file, the original video segment having failed a quality control procedure, wherein the quality control procedure comprises verifying that the original video segment is free from one or more digital media artifacts;
obtaining a timestamp and length of the original video segment;
obtaining a video statistics file output during transcoding the transcoded video file;
parsing the video statistics file to generate a key frame listing file for the video segment, wherein the key frame listing file comprises a plurality of key frame identifiers, each key frame identifier comprising an original key frame index equal to a frame number of a corresponding key frame;
assigning to each key frame identifier a renumbered key frame index without changing a relative spacing between adjacent renumbered key frame indices as compared with adjacent original key frame indices, wherein a first renumbered key frame index from a key frame identifier located at a beginning of the key frame listing file equals a first frame number corresponding to a first key frame located at a beginning of the original video segment; and
the memory storing instructions to cause the transcoder to re-transcode the original video segment to produce a re-transcoded video segment using the key frame listing file, such that a re-transcoded key frame location in the re-transcoded video segment is the same as an original key frame location from the original video segment,
wherein the transcoded video file is transcoded at a first bitrate and is one of a plurality of transcoded video files transcoded at a corresponding plurality of bitrates, and further comprising:
using the key frame listing file, re-transcodinq video segments corresponding to the original video segment from each of the plurality of transcoded video files to produce a plurality of corresponding re-transcoded video segments for each of the plurality of bitrates.

18. The computer of claim 17, wherein the key frame listing file further comprises a quantization parameter for each key frame.

19. The computer of claim 17, wherein the memory stores instructions to cause the processor to perform the step of:
parsing the video statistics file to generate a video segment statistics file for the original video segment;
wherein the step of re-transcoding the original video segment further comprises utilizing the video segment statistics file during re-transcoding the original video segment.

20. The computer of claim 17, wherein the memory stores instructions to cause the processor to perform the step of updating the transcoded video file by replacing the original video segment with the re-transcoded video signal.

21. The computer of claim 20, wherein the memory stores instructions to cause the processor to perform the step of updating the video statistics file by replacing a portion of the video statistics file corresponding to the original video segment with a re-transcoded video segment statistics file generated during the step of re-transcoding the original video segment.

22. The computer of claim 17, wherein the memory stores instructions to cause the processor to perform the step of:
updating each of the plurality of transcoded video files by replacing the video segments corresponding to the original video segment with the corresponding re-transcoded video segment.

23. The computer of claim 17, wherein the digital media artifacts comprise ringing, blocking, or picture break-up.

24. The computer of claim 17, wherein the first frame number is 0.

* * * * *